Oct. 11, 1966
J. L. HANSON
3,277,645

TIME CORRECTION DEVICE FOR MASTER CLOCKS

Filed March 29 1965

INVENTOR.
JOHN L. HANSON
BY Joseph G. Werner
ATTORNEY

United States Patent Office 3,277,645

Patented Oct. 11, 1966

3,277,645

TIME CORRECTION DEVICE FOR MASTER CLOCKS

John L. Hanson, Madison, Wis., assignor to Ideas Unlimited, Incorporated, Madison, Wis., a corporation of Wisconsin Filed Mar. 29, 1965, Ser. No. 443,210
4 Claims. (Cl. 58—24)

This invention relates generally to time correction devices for clocks and more particularly to time correction devices for use in connection with the master clock of a master-secondary clock system for advancing the movement of the master clock for a predetermined time at a faster velocity than its regular velocity and for retarding the movement of the master clock for a predetermined time.

Typical master-secondary clock systems employ a master clock which controls a plurality of secondary clocks usually scattered throughout the premises. The secondary clocks are automatically corrected at regular short intervals by the master clock to insure that they remain in synchronism with the master clock. "Daylight Savings" time presents a special problem every spring and fall in regard to such master-secondary clock systems. In the spring, the master clock of such a system must be set ahead 1 hour to "Daylight Savings" time and in the fall it must be set back 1 hour to "Standard" time. Once the master clock is corrected it will then, of course, automatically impart the correction to the secondary clocks in the system. It should be understood that my invention relates to a device for setting the master clock and is not concerned with the particular mechanism by which the master clock synchronizes its secondary clocks.

Due to the complex nature of conventional master clocks and the fact that each correction for going on and off "Daylight Savings" time is made only once a year, regular staff personnel usually face the problem of unfamiliarity and, therefore, in the past, it was usually necessary for a clock service specialist to make a rather technical and time-consuming manual adjustment of the master clock.

My apparatus is designed to set master clocks of the non-pendulum type whose movement is driven through a differential which is in turn driven by a synchronous motor from a normal source of power, usually the local power source. The master clocks with which my apparatus is designed to be utilized also have a secondary drive mechanism either in the form of a clock spring or a second synchronous motor powered from a reserve power source such as a battery for driving the movement of the master clock at its regular velocity should the normal source of power fail. Normally, the secondary drive mechanism is maintained inoperative and the master clock is driven from the normal source of power by the primary drive mechanism; however, when the normal source fails, the interruption of normal power, causes secondary drive mechanism to operate to drive the movement of the master clock at its regular speed until normal power is restored.

The primary object of my invention is to provide a device for use in connection with the master clock of a master-secondary clock system for advancing and retarding the master clock for a predetermined time as desired. Further objects, features and advantages of my invention will be apparent from the following detailed description taken in conjunction with the accompanying drawings showing my invention.

My device operates generally as follows:

When the master clock is operating on normal power and it is desired to advance the master clock, for example, one hour to "Daylight Savings" time, the manual actuation of my device causes the secondary drive mechanism to drive the movement of the master clock at twice its regular speed for one hour, that is, the movement of the master clock is advanced two hours during a one hour period of time. After one hour, my device causes the secondary drive mechanism to be rendered inoperative while maintaining power to the primary drive motor, whereby, the movement of the master clock is then restored to its regular speed.

In order to retard the movement of the master clock for one hour for resetting it from "Daylight Savings" time to "Standard" time, the manual actuation of my device causes the normal power to the primary drive motor to be interrupted while at the same time maintaining the secondary drive mechanism inoperative, thus, stopping the master clock. After one hour, my device causes normal power to be restored to the primary drive motor to drive the master clock at its regular speed.

Figure 1:
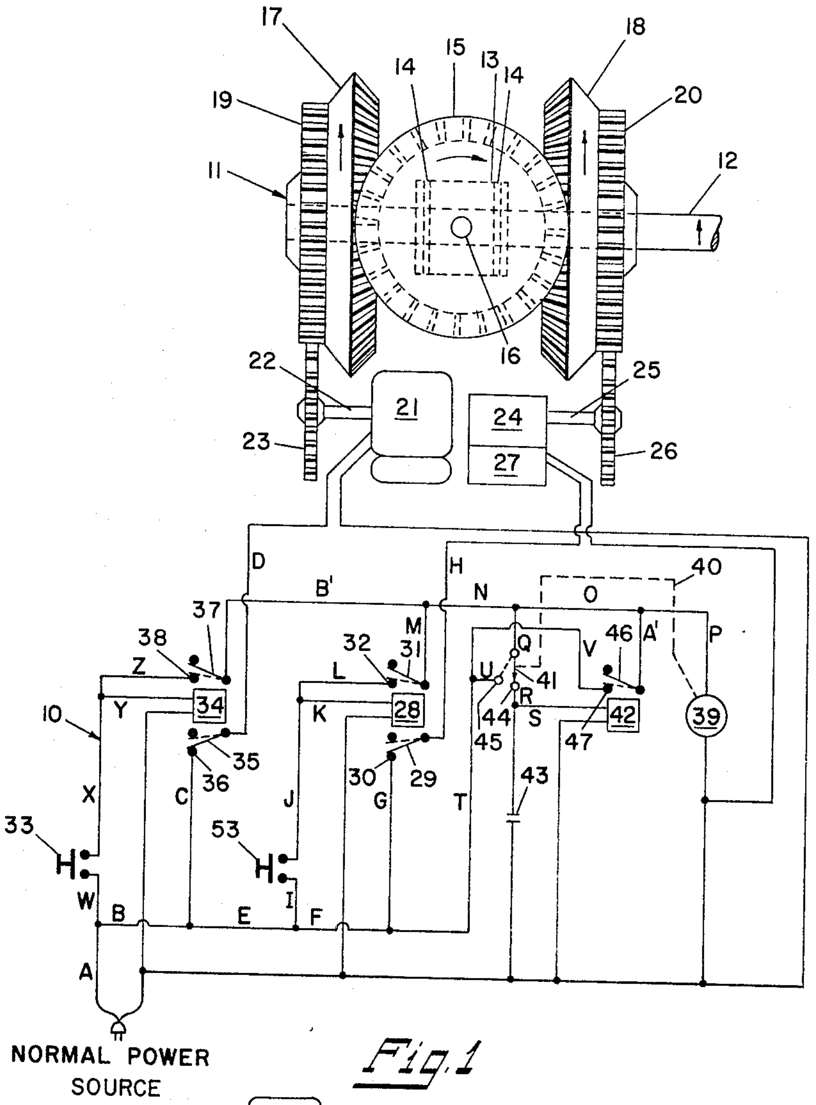
FIGURE 1 is a schematic view of my invention in connection with the drive mechanism of a master clock.

Referring now more specifically to FIG. 1, my device is schematically shown at 10 in connection with a differential 11 of a master clock (not shown). The differential 11 has an output shaft 12 for driving the movement of the master clock. A pinion carrier 13 is secured in fixed relation on the output shaft 12 by any suitable means such as, pins 14. A pinion 15 is mounted on pinion carrier for rotation about transverse pivot shaft 16. A pair of bevel gears 17 and 18 are freely mounted on drive shaft 12 for rotation with respect thereto. Gears 17 and 18 engage pinion 15 as shown in FIG. 1. A pair of ring gears 19 and 20 are also freely mounted on drive shaft 12 and are fixedly secured to bevel gears 17 and 18, respectively. Ring gear 19 is driven from a primary drive motor 21 through motor drive shaft 22 and drive gear 23 which engages ring gear 19. The motor 21 is driven from a normal power source which would usually be the local power source. The ring gear 20 is driven from a secondary drive mechanism shown in FIG. 1 in the form of a clock spring 24 which is adapted to rotate drive shaft 25 and drive gear 26 which engages ring gear 20.

Under normal operating conditions the secondary drive mechanism, that is, spring 24 is maintained inoperative by electric brake 27 and the primary drive motor 21 drives the movement of the master clock from the normal power source.

The operation of the differential 11 of the master clock is as follows: Looking at the differential from the left side of FIG. 1, the primary drive motor 21 drives gear 23 clockwise which in turn drives ring gear 19 and bevel gear 17 counterclockwise, that is, in the direction of the arrow on bevel gear 17 as seen in FIG. 1. This causes pinion 15 to rotate clockwise as shown by the arrow thereon in FIG. 1 and also travel in a circular path on the teeth of bevel gear 18 which remains stationary. Thus, as the pinion 15 is driven by the rotation of bevel gear 17, half of its motion is clockwise rotation about pivot pin 16 and half of its motion is in a circular path traveling around on bevel gear 18. As the pinion 15 travels around on bevel gear 18, it causes the drive shaft 12 to be rotated in the direction of the arrow thereon in FIG. 1 at regular time-keeping speed. If the normal power should fail, the electrically operated brake 27 is released and the secondary drive mechanism, spring 24, drives the bevel gear 18 in a counterclockwise direction as shown by the arrow on bevel gear 18 in FIG.1 through drive gear 26 and ring gear 20. Since bevel gear 17 now remains stationary because there is no power emanating from the normal power source, the pinion 15 is rotated in a counterclockwise direction (opposite the arrow shown thereon in FIG. 1) by the bevel gear 18 and it travels in a circular path on the teeth of bevel gear 17, which is stationary. Thus, one-half of the motion of pinion 15 is now counterclockwise rotation about pivot pin 16 and the other half of its motion is in a circular path about bevel gear 17 which causes the drive shaft 12 of the differential to be rotated in the direction of the arrow thereon in FIG. 1 at regular time-keeping speed.

My time correction device 10 has a first double pole double throw relay 28 adapted to be energized through a first manually operable switch 53 for advancing the movement of the master clock at twice its regular speed for setting the master clock ahead a predetermined time, such as, one hour for changing from "Standard" time to "Daylight Savings" time. As shown in FIG. 1 relay 28 has arm 29 which is normally closed against contact 30 and arm 31 which is normally open, that is, out of engagement with contact 32.

A second manually operable switch 33 and a second double pole double throw relay 34 are provided for stopping the movement of the master clock for a predetermined time, such as, for one hour for changing from "Daylight Savings" time back to "Standard" time. Relay 34 has an arm 35 which is normally closed against contact 36 for supplying power from the normal power source to the primary drive motor 21. Relay 34 also has an arm 37 which is normally open, that is, out of engagement with contact 38.

A timer motor 39 is provided for controlling the interval of time during which the master clock is advanced at twice its regular speed or during which it is stopped. The timer motor 39 controls the operation of my time correction device through a mechanical connection represented by 40 in FIG. 1 which operates a single pole double through micro-switch 41.

While the timer motor 39 shown in the drawings and described herein is designed for advancing or retarding a master clock one hour, it is understood that timers which can be set for various intervals of time may be employed for advancing or retarding the master clock more or less than one hour, if desired, without departing from my invention.

A single pole single throw relay 42 is provided for supplying power to timer motor 39 and for sealing relays 28 and 34 after the manually operable switches 53 and 33 are released. A capacitor 43 is provided for delaying the dropout time of relay 42 when microswitch 41 transfers from contact 44 to contact 45 as more fully discussed hereinafter.

The operation of my time correction device 10 will now be described as it is used to advance a master clock one hour, such as is necessary to switch from "Standard" time to "Daylight Savings" time.

The movement of the master clock is normally driven at its regular velocity through differential 11 by primary drive motor 21 which is energized from the normal power source through normally closed contact 36 via line ABCD as shown in FIG. 1 As mentioned herein before, when being so operated, the pinion 15 is rotating clockwise as shown by the arrow thereon in FIG. 1 and travels around in a circular path on bevel gear 18 which is maintained stationary by electrically operated brake 27 which is energized from the normal power source through normally closed contact 30 via line ABEFGH.

To advance the master clock one hour, switch 53 is manually closed energizing relay 28 through line ABEIJK. The energizing of relay 28 causes arm 29 thereof to open or break contact 30 which de-energizes electrical brake 27 and releases the spring 24 to drive bevel gear 18 in the direction of the arrow on bevel gear 18 in FIG. 1. Since both bevel gears 17 and 18 are being driven in the same direction at a constant velocity, pinion 15 does not rotate about pivot pin 16, but instead is carried in a circular path by both the bevel gears 17 and 18. The circular motion of the pinion 15 is transferred to drive shaft 12 by pivot pin 16 and pinion carrier 13, and thus, causes the drive shaft 12 to be rotated at twice its regular velocity.

The switch 53 is a push-button type switch and may be immediately released after being manually actuated.

The energizing of relay 28 causes arms 31 to close against contact 32, thus, energizing timer motor 39 via line ABEIJLMNOP and energizing relay 42 through line ABEIJLMNQRS which includes micro-switch 41 which is normally closed against contact 44 as shown in FIG. 1.

When energized, relay 42 provides a circuit, via line ABEFTVA'ONMLK, including arms 31 and 46, to keep relay 28 energized after button 53 is released. Relay 42 also provides a circuit via line ABEFTVA'P which includes arm 46 to keep timer motor 39 energized after button 53 is released.

After a short time the timer motor 39 through the mechanical connection represented by 40, causes micro-switch 41 to break contact 44 and transfer to contact 45. The timer motor 39 is then energized through line ABEFTUQOP, which includes contact 45. Relay 28 is kept energized via line ABEFTUQNMLK, which includes contact 45 of micro-switch 41 and an arm 31 of relay 28. The transferring of micro-switch 41 from contact 44 to 45 causes relay 42 to be de-energized and arm 46 thereof returns to its normally open position. The capacitator 43 delays the dropout time of relay 42 in order to allow micro-switch 41 to physically transfer from contact 44 to contact 45 without de-energizing timing motor 39 and relay 28. The movement of the master clock is driven at twice its regular velocity by primary drive motor 21 and secondary drive spring 24 for one hour. After one hour has elapsed, the timer motor 39 through mechanical connection 40, causes the arm of micro-switch 41 to break contact 45 and transfer back to contact 44 breaking the circuit through line ABEFTUQOP, and, thus, causing relay 28 to be de-energized and timer motor 39 to be stopped. Drive shaft 12 of differential 11 is, thus, restored to its regular rotary velocity which is imparted thereto by primary drive motor 21 powered from the normal power source through normally closed contact 36 of relay 34.

The operation of my time correction device will now be described as it is used to stop the master clock for one hour. The movement of the master clock is normally driven at its regular velocity through differential 11 by primary drive motor 21 which is energized from the normal power source through normally closed contact 36 of relay 34. Meanwhile, the energy of spring 24 is locked in or braked by electrical brake 27 which is energized through normally closed contact 30 via line ABEFGH. To retard or stop the master clock for one hour, switch 33 is manually closed which energizes relay 34 through line AWXY. The energizing of relay 34 causes arm 35 thereof to open or break contact 36, thus, breaking line ABCD and de-energizing the primary drive motor 21. Since power is maintained to electric brake 27 through normally closed contact 30 via line ABEFGH, thus keeping spring 24 braked, the rotation of drive shaft 12 of differential 11 is stopped. The closing of switch 33 which energizes relay 30 also causes arm 37 thereof to be closed against contact 38 and causes timer motor 39 to be energized via line AWXZB'NOP and causes relay 42 to be energized through micro-switch 41 via line AWXZB'NQRS. The energizing of relay 42 causes arm 46 to close against contact 47 which allows timer motor 39 to be energized through line ABEFTVA'P after manually operated switch 33 is released. Relay 42 also provides a circuit, via line ABEFTVA'ONB'ZY including arms 46 and 37, to keep relay 34 energized.

After a short time, timer motor 39 through mechanical connection 40 causes micro-switch 41 to break contact 44 and transfer to contact 45. This causes relay 42 to be de-energized and causes arm 46 to open or break contact 47. The timer motor 39 is then energized through line ABEFTUQOP including contact 45 of micro-switch 41. Micro-switch 41 also provides a circuit to keep relay 34 energized via line ABEFTUQNB'ZY including contact 45 of micro-switch 41 and arm 37. The capacitor 43 delays the dropout time of relay 42 in order to allow micro-switch 41 to transfer from contact 44 to contact 45 without de-energizing timer motor 39 and relay 34.

After one hour has elapsed, the timer motor causes micro-switch 41 to break contact 45, thus, interrupting line ABEFTUQOP to shut off timer motor 39 and also causing relay 34 to be de-energized, thus, causing arm 35 to close against contact 36 and restore power to primary drive motor 21 through line ABCD to drive the movement of the master clock at its regular velocity.

Figure 2:
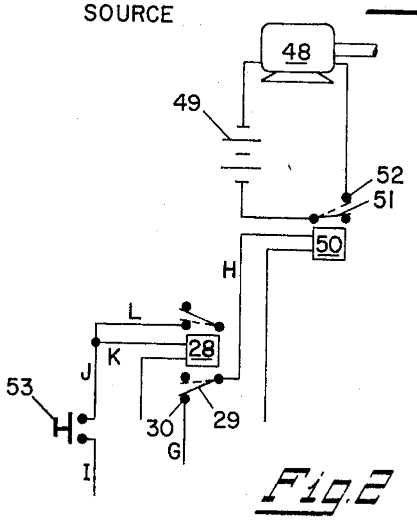
FIGURE 2 is a schematic view of a portion of a modified form of my invention in connection with a motor-battery type secondary drive mechanism for a master clock.

While the secondary drive mechanism shown in FIG. 1 is in the form of a clock spring and brake arrangement, my device can be utilized in connection with a master clock wherein, as shown in FIG. 2, the secondary drive mechanism is in the form of a motor 48 and battery 49. A slightly modified form of my invention has a relay 50 connected between the secondary drive motor 48 and the reserve power source, battery 49. The relay 50 is such that it is open when energized and closed when de-energized. Relay 50 would be in its open energized condition when switch 53 is open and, therefore, no current would be supplied to the motor 48 from battery 49 so that motor 48 would normally be inoperative. When it is desired to advance the movement of the master clock one hour manually operable switch 53 would be closed which energizes relay 28 as hereinbefore described which causes arm 29 to break contact 30 cutting off the circuit through line ABEFGH and, thus, de-energizing relay 50 which causes the arm 51 thereof to close against contact 52 to complete a circuit from battery 49 to secondary drive motor 48. The pinion 15 of differential 11 would, thus, be driven from both motors 21 and 48 and the movement of the master clock would be advanced at a faster velocity than its regular velocity. The remainder of the operation of this modified form of my device is the same as that of the embodiment shown in FIG. 1.

It is understood that my invention is not confined to the particular construction or arrangement of parts herein illustrated and described, but embraces all such modified forms thereof as may come within the scope of the following claims.

I claim:

1. A correction device for advancing the movement of the master clock in a master-secondary clock system wherein the movement of said master clock is normally driven at a regular velocity from a normal power source by a primary drive mechanism and wherein said master clock has a secondary drive mechanism for automatically driving the movement of said master clock at its regular velocity upon failure of the normal power source, said correction device comprising:

(a) a double pole double throw relay having a normally open and a normally closed contact, the secondary drive mechanism of said master clock being maintained inoperative through the normally closed contact of said relay, (b) means for energizing the primary drive mechanism of said master clock from said normal power source, (c) a manually operable switch, the closing of which supplies power to said relay from the normal power source which causes said normally open contact of said relay to be closed and which causes said normally closed contact of said relay to be opened to render the secondary drive mechanism operative whereby the rotation of said secondary drive mechanism is compounded with the rotation of said primary drive mechanism to drive the movement of said master clock at a faster velocity than its regular velocity, (d) means for maintaining power to said relay after said manually operable switch is opened, and (e) a timer motor for cutting off power to said relay after a predetermined time to restore the movement of said master clock to its regular velocity.

2. A correction device for retarding the movement of the master clock in a master-secondary clock system wherein the movement of said master clock is normally driven at a regular velocity from a normal power source by a primary drive mechanism and wherein said master clock has a secondary drive mechanism for automatically driving the movement of said master clock at its regular velocity upon failure of the normal power source, said correction device comprising:

(a) a double pole double throw relay having a normally open contact and a normally closed contact, said primary drive mechanism being energized from said normal power source through said normally closed contact of said relay, (b) means for maintaining said secondary drive mechanism inoperative while said primary drive mechanism is energized from said normal power source, (c) a manually operable switch, the closing of which supplies power to said relay from said normal power source and causes said normally open contact of said relay to be closed and which causes said normally closed contact of said relay to be opened to cut off the normal power to said primary drive mechanism, (d) means for maintaining power to said relay after said manually operable switch is opened, and (e) a timer motor for cutting off power to said relay after a predetermined time to restore the movement of said master clock to its regular velocity.

3. A correction device for advancing and retarding the movement of the master clock in a master-secondary clock system wherein the movement of said master clock is normally driven at a regular velocity from a normal power source by a primary drive motor, and wherein said master clock has a secondary drive mechanism for automatically driving the movement of said master clock at its regular velocity upon failure of the normal power source, said correction device comprising:

(a) a first double pole double throw relay having a normally closed contact through which the secondary drive mechanism of said master clock is maintained inoperative, (b) a second double pole double throw relay having a normally closed contact through which the primary drive motor of said master clock is energized from said normal power source, (c) a first manually operable switch, the closing of which supplies power to said first relay from said normal power source which causes the normally closed contact of said first relay to be opened to render said secondary drive mechanism operative whereby the rotation of said secondary drive mechanism is compounded with the rotation of said primary drive mechanism for driving the movement of said master clock at a faster velocity than its regular velocity, (d) a second manually operable switch, the closing of which supplies power to said second relay from said normal power source which causes the normally closed contact of said second relay to be opened for interrupting power to said primary drive motor, (e) means for maintaining power to said first relay after said first manually operable switch is opened and for maintaining power to said second relay after said second manually operable switch is opened, and (f) a timer motor for interrupting power to said first and second relays after a predetermnied time to restore the movement of said master clock to its regular velocity.

4. A correction device for advancing and retarding the movement of the master clock in a master-secondary clock system wherein the movement of said master clock is normally driven at a regular velocity from a normal power source by a primary drive motor, and wherein said master clock has a secondary drive motor adapted to be driven from a reserve power source for driving the movement of said master clock upon failure of the normal power source, said correction device comprising:

(a) a relay connected between said secondary drive motor and said secondary power source, said relay normally being energized from said normal power source and thereby interrupting the circuit between said reserve power source and said secondary drive motor, (b) means for cutting off normal power to said relay to close said circuit for supplying power from said reserve power source to said secondary drive motor, (c) means for maintaining power from said normal source to said primary drive motor while power is supplied to said secondary drive motor through said relay whereby the movement of said master clock is driven at a faster velocity than its regular velocity, (d) means for automatically supplying power to said relay to interrupt said circuit between said reserve power source and said secondary drive motor after a predetermined time to render said secondary drive motor inoperative while maintaining power to said primary drive motor whereby the movement of said master clock is restored to its regular velocity, (e) means for cutting off the normal power to said primary drive motor while supplying energy from said normal power source to said relay to interrupt the circuit between said reserve power source and said secondary drive motor whereby the movement of said master clock is stopped, and (f) a timer for automatically restoring normal power to said primary drive motor after a predetermined time while maintaining normal power to said relay for interrupting the circuit between said reserve power source and said secondary drive motor whereby the movement of said master clock is restored to its regular velocity.

References Cited by the Examiner

UNITED STATES PATENTS

| | | | |
|---|---|---|---|
| 2,909,891 | 10/1959 | Hibbard et al. -------- | 58—26 |
| 3,184,909 | 5/1965 | Lohf et al. ------------ | 58—2 |

RICHARD B. WILKINSON, *Primary Examiner.*

GERALD F. BAKER, *Examiner.*